(12) United States Patent
Lea

(10) Patent No.: US 6,477,573 B1
(45) Date of Patent: Nov. 5, 2002

(54) SYSTEM AND METHOD FOR PERFORMING A HIERARCHICAL REMOTE QUERY IN AN ELECTRONIC NETWORK

(75) Inventor: Rodger James Lea, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/289,498

(22) Filed: Apr. 9, 1999

(51) Int. Cl.⁷ .............................................. G06F 15/173
(52) U.S. Cl. ........................ 709/224; 709/203; 709/223; 709/224; 370/254; 710/11; 710/104
(58) Field of Search ................................. 709/105, 203, 709/224, 223; 705/8; 712/1; 713/200–203; 710/104, 11; 707/10; 380/279; 395/500.44; 370/254; 455/433

(56) References Cited

U.S. PATENT DOCUMENTS

| | | | | |
|---|---|---|---|---|
| 4,905,171 A | * | 2/1990 | Kiel et al. .................... 702/186 |
| 5,420,573 A | | 5/1995 | Tanaka et al. ......... 340/825.24 |
| 5,511,208 A | * | 4/1996 | Boyles et al. ................. 707/10 |
| 5,537,605 A | * | 7/1996 | Teece ............................. 712/1 |
| 5,701,482 A | * | 12/1997 | Harrison et al. ............. 709/105 |
| 5,721,825 A | * | 2/1998 | Lawson et al. ............. 709/203 |
| 5,826,239 A | * | 10/1998 | Du et al. ....................... 705/8 |
| 5,838,903 A | * | 11/1998 | Blakely, III et al. ........ 713/202 |
| 5,862,323 A | * | 1/1999 | Blakley, III et al. ........ 713/200 |
| 5,907,696 A | * | 5/1999 | Stilwell et al. ......... 395/500.44 |
| 6,003,097 A | * | 12/1999 | Richman et al. .............. 710/11 |
| 6,029,246 A | * | 2/2000 | Bahr ........................... 713/200 |
| 6,119,186 A | * | 9/2000 | Watts et al. ................. 710/104 |
| 6,131,118 A | * | 10/2000 | Stupek et al. ............... 709/223 |
| 6,144,960 A | * | 11/2000 | Okada et al. .................. 707/10 |
| 6,192,250 B1 | * | 2/2001 | Buskens et al. ............. 455/433 |
| 6,192,281 B1 | * | 2/2001 | Brown et al. .................. 700/2 |
| 6,205,122 B1 | * | 3/2001 | Sharon et al. ............... 370/254 |
| 6,212,280 B1 | * | 4/2001 | Howard, Jr. et al. ........ 380/279 |
| 6,260,148 B1 | * | 7/2001 | Aggarwal et al. .......... 713/201 |
| 6,360,260 B1 | * | 3/2002 | Compliment et al. ....... 709/223 |

\* cited by examiner

Primary Examiner—Ayaz Sheikh
Assistant Examiner—Thu Ha Nguyen
(74) Attorney, Agent, or Firm—Gregory J. Koerner; Simon & Koerner LLP

(57) ABSTRACT

A system and method for performing a hierarchical remote query in an electronic network comprises a local registry that classifies remote registries into discrete categories based upon the relative capability of their host devices. The local registry then broadcasts a remote query to the discrete categories of remote registries in a hierarchical sequence. The present invention thus propagates the remote query in a sequence that produces optimal likelihood of a successful remote query reply, while simultaneously conserving network resources and minimizing messaging traffic across the electronic network.

20 Claims, 11 Drawing Sheets

SYSTEM AND METHOD FOR PERFORMING A HIERARCHICAL REMOTE QUERY IN AN ELECTRONIC NETWORK

CROSS-REFERENCE TO RELATED APPLICATIONS

This application relates to co-pending U.S. patent application Ser. No. 09/259,504, entitled "System And Method For Incrementally Updating Remote Element Lists In An Electronic Network," filed on Feb. 26, 1999, to co-pending U.S. patent application Ser. No. 09/257,344, entitled "System And Method For Implementing Active Registries In An Electronic Network," filed on Feb. 25, 1999, to co-pending U.S. patent application Ser. No. 09/289,500, entitled "System And Method For Maintaining Fully-Replicated Registries In An Electronic Network," filed on Apr. 9, 1999, and to co-pending U.S. patent application Ser. No. 09/288,995, entitled "System And Method For Locally Caching Remote Query Replies In An Electronic Network," filed on Apr. 9, 1999, which are hereby incorporated by reference. The cross-referenced applications are commonly assigned.

BACKGROUND OF THE INVENTION

1. Field of the Invention

This invention relates generally to electronic networks, and relates more particularly to a system and method for performing a hierarchical remote query in an electronic network.

2. Description of the Background Art

Implementing an effective method for managing communications between software elements that reside on electronic devices within an electronic network is a significant consideration for manufacturers and designers of contemporary electronic devices. An electronic device in a distributed electronic network may advantageously communicate with other remote electronic devices in the network to share and substantially increase the resources available to individual devices in the network. For example, an electronic network may be implemented in a user's home to enable flexible and beneficial sharing of resources between various consumer electronic devices, such as personal computers, digital video disk devices, digital set-top boxes for digital broadcasting, television sets, and audio playback systems.

Managing and controlling efficient communications in a network of electronic devices may create substantial challenges for designers of electronic networks. For example, enhanced demands for increased functionality and performance many require more system processing power and require additional hardware resources across the network. An increase in processing or hardware requirements may also result in a corresponding detrimental economic impact due to increased production costs and operational inefficiencies.

Network size and device functionality are also factors that affect the control and management of an electronic network. Communications in an electronic network typically become more complex as the number of individual devices or nodes increases. Assume that a particular device on an electronic network is defined as a local device with local software elements, and other devices on the electronic network are defined as remote devices with remote software elements. Accordingly, a local software element on the local device may need to communicate with various remote software elements on remote devices across the electronic network. However, successfully managing a substantial number of electronic devices across a single network may provide significant benefits to a system user.

Furthermore, enhanced device capability to perform various advanced functions may provide additional benefits to a system user, but may also place increased demands on the control and management of various devices in the electronic network. For example, an electronic network that effectively accesses, processes, and displays digital television programming may benefit from efficient network management techniques because of the large amount and complexity of the digital data involved.

In addition, initiating and managing complex messaging processes between various devices over an extended electronic network may consume substantial amounts of processing resources from the various devices that form the electronic network. For example, as the number of devices and corresponding software elements on an electronic network increase, a given message that is repeatedly propagated to software elements across the electronic network may create an undue amount of network traffic and thus have an adverse effect on overall performance of the electronic network.

Therefore, for all the foregoing reasons, implementing an effective method for managing communications between various software elements in a distributed electronic network remains a significant consideration for designers, manufacturers, and users of electronic devices.

SUMMARY OF THE INVENTION

In accordance with the present invention, a system and method are disclosed for performing a hierarchical remote query in an electronic network. Initially, local registries in the electronic network preferably classify remote registries into discrete categories depending upon the relative capabilities of their host devices on the electronic network.

In one embodiment of the present invention, an added-device notification is preferably generated and provided to registries in the electronic network whenever a new device is added to the electronic network. Each local registry then responsively sends a query to self-describing data residing in memory of the new device. Each local registry then preferably calculates a capability value for the new device, based upon parameters such as processing power, memory resources, and communications bandwidth. Each local registry may then advantageously classify the registry of the new device into an appropriate category based on the relative capability of the new device.

The present invention then utilizes the discrete categories of remote registries to efficiently perform a remote query procedure to locate a target software element for a network messaging process. In practice, whenever a local query from a local software module to a local registry is unsuccessful in locating a target software element for the network messaging process, then the local registry initially creates and broadcasts a remote query only to the most-capable category of remote registries on the electronic network.

If the initial remote query is successful, then the remote query process terminates, and a software element identifier for the target software element is preferably returned to the local software module that initiated the query process. However, if the initial remote query is unsuccessful, then the local registry repeatedly rebroadcasts the remote query to successive categories of remote registries from less capable devices, until either a successful remote query reply is received or all categories have been queried without a successful reply.

The present invention thus initially propagates a remote query only to devices with relatively greater processing power and communications bandwidth to provide a rapid query response without significantly depleting valuable network processing resources needed for other tasks. Furthermore, the present invention initially propagates the remote query only to devices with relatively greater memory resources and higher concentrations of individual software elements to thereby substantially increase the likelihood of a successful remote query response, while simultaneously reducing the amount of messaging traffic across the electronic network. The present invention thus effectively and efficiently performs a hierarchical remote query in an electronic network.

DETAILED DESCRIPTION OF THE PREFERRED EMBODIMENT

The present invention relates to an improvement in electronic network technology. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

The present invention comprises a system and method for performing a hierarchical remote query in an electronic network, and includes a local registry that classifies remote registries into discrete categories based upon the relative capability of their host devices. The local registry then broadcasts a remote query to the discrete categories of remote registries in a hierarchical sequence. The present invention thus propagates the remote query in a sequence that produces optimal likelihood of a successful remote query reply, while simultaneously conserving network resources and minimizing messaging traffic across the electronic network.

Figure 1:
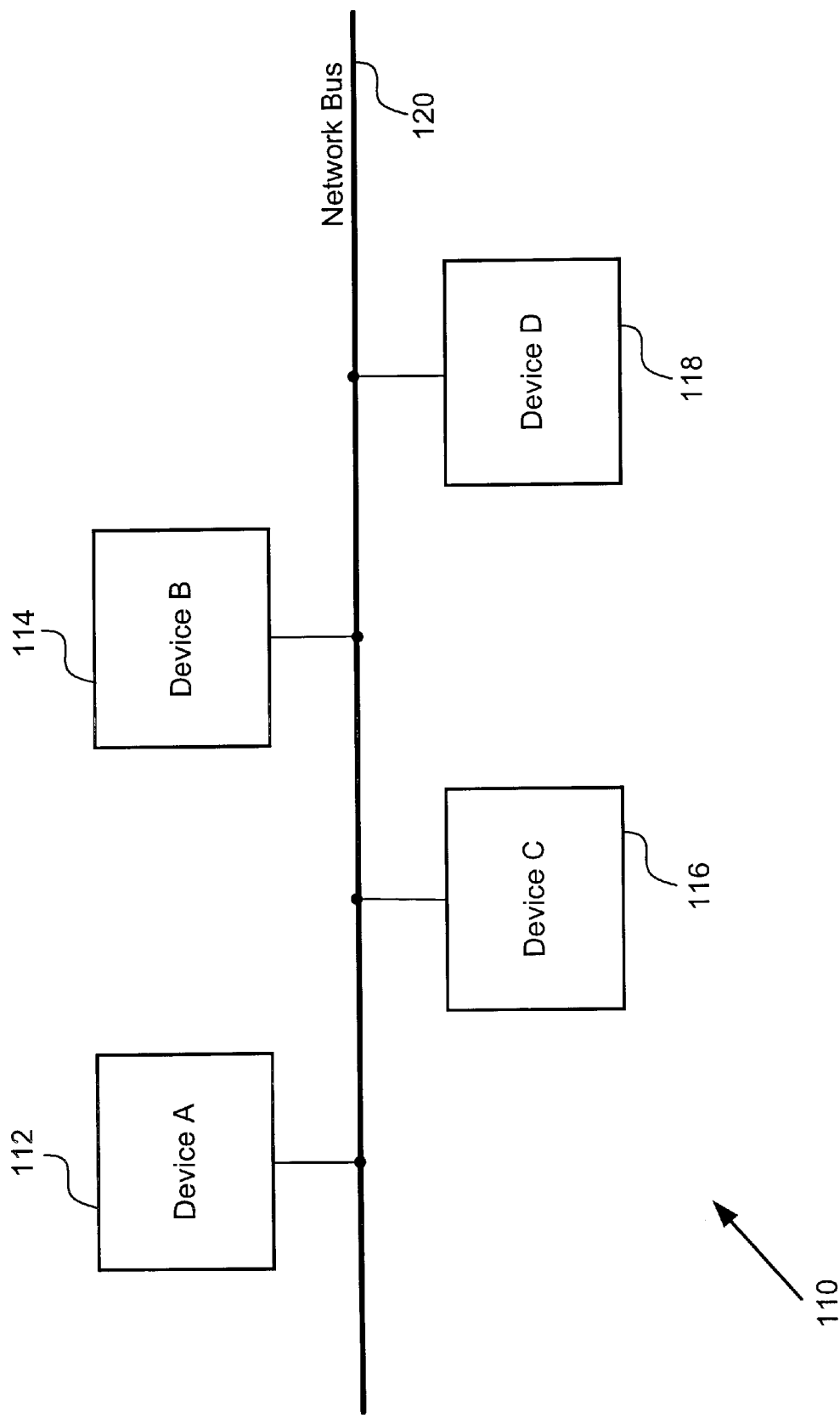
FIG. 1 is a block diagram for one embodiment of an electronic network, in accordance with the present invention.

Referring now to FIG. 1, a block diagram for one embodiment of an electronic network 110 is shown, in accordance with the present invention. In the FIG. 1 embodiment, network 110 includes, but is not limited to, device A 112, device B 114, device C 116, and device D 118. In other embodiments, network 110 may readily be implemented using a larger or smaller number of devices than the four devices (device A 112 through device D 118) shown in the FIG. 1 embodiment.

In the FIG. 1 network 110, device A 112, device B 114, device C 116, and device D 118 preferably communicate with each other through a commonly-shared network bus 120. In the FIG. 1 embodiment, network bus 120 is preferably implemented according to the IEEE 1394 interconnectivity standard. However, in alternate embodiments, other appropriate and compatible interconnectivity standards are also contemplated for use in conjunction with the present invention.

In the FIG. 1 embodiment, network 110 may preferably be configured to operate in accordance with the Home Audio/Video Interoperability (HAVi) core specification (version 1.0 beta, Nov. 19, 1998) which is hereby incorporated by reference. Therefore, device A 112, device B 114, device C 116, and device D 118 may be implemented as various types of consumer electronics devices, including, but not limited to, personal computers, digital video disk devices, television sets, audio reproduction systems, video tape recorders (VCRs), and set-top boxes for digital video broadcasting. However, in various alternate embodiments, network 110 may readily be implemented as any appropriate electronic network configured to permit communication between any desired types of electronic devices.

In the FIG. 1 embodiment, the various electronic devices that form part of network 110 preferably include the following four categories of electronic devices: full devices (FD), intermediate devices (ID), base devices (BD), and legacy device (LD). The foregoing four categories of electronic devices (FD, ID, BD, and LD) are further discussed below in conjunction with FIGS. 2 and 3. In alternate embodiments of the present invention, network 110 may readily includes various other categories of electronic devices in addition to, or instead of, the four categories of FD, ID, BD, and LD.

Figure 2:
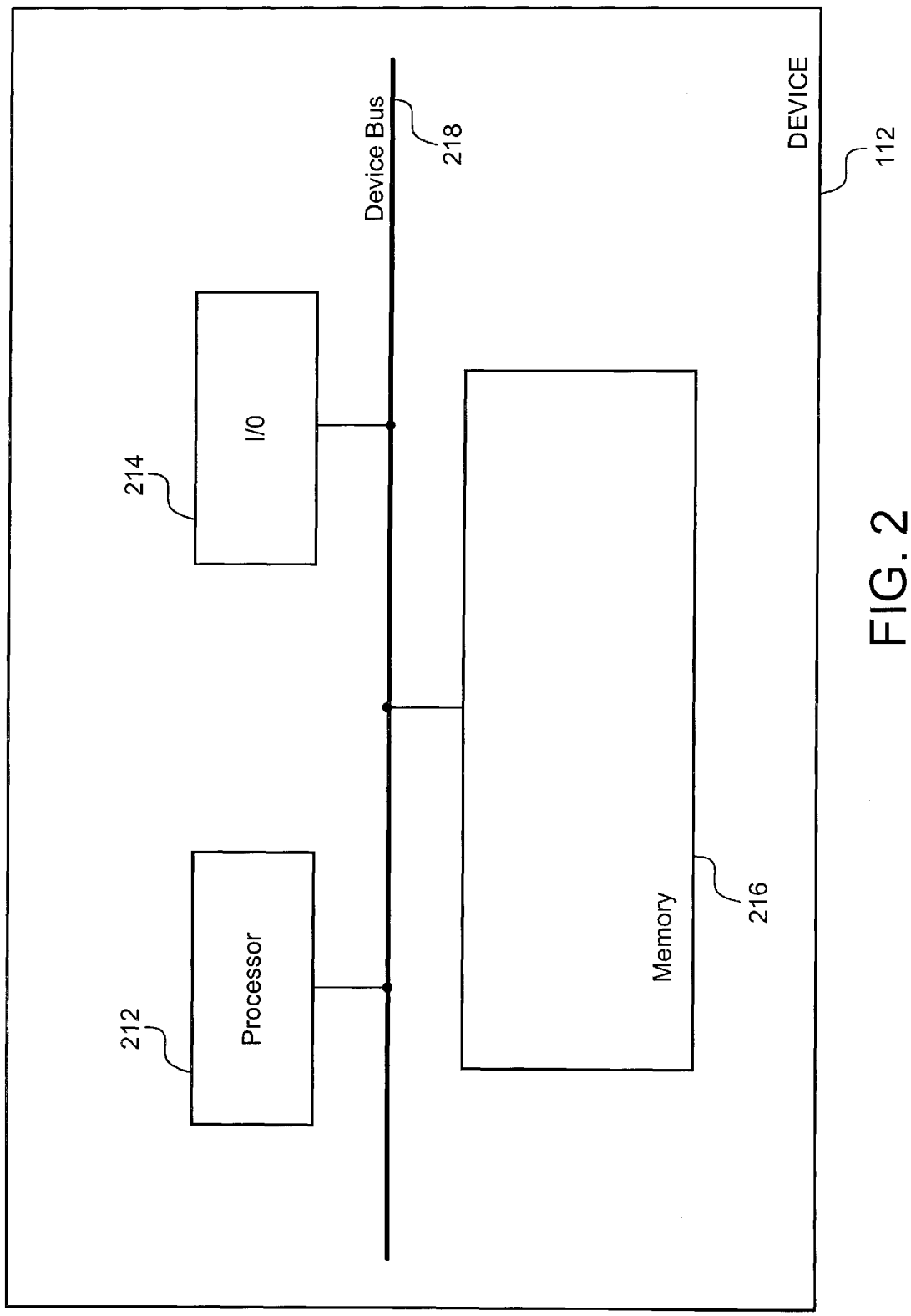
FIG. 2 is a block diagram for one embodiment of an exemplary device from FIG. 1, in accordance with the present invention.

Referring now to FIG. 2, a block diagram for one embodiment of an exemplary device 112 from FIG. 1 is shown, in accordance with the present invention. In the FIG. 2 embodiment, device 112 preferably includes, but is not limited to, a processor 212, an input/output interface (I/O) 214, and a memory 216 that are each coupled to, and communicate with each other via, a common device bus 218. In the FIG. 2 embodiment, device 112 is preferably configured to represent either a full device or an intermediate device, as referred to above in the discussion of the FIG. 1 network 110.

In the FIG. 2 embodiment, processor 212 may be implemented to include any appropriate and compatible generic, multi-purpose microprocessor device. The FIG. 2 input/output interface (I/O) 214 preferably provides an effective interface to facilitate communications between device 112 and network bus 120 (FIG. 1). In the FIG. 2 embodiment, memory 216 may be implemented to include any combination of desired storage devices, including, but not limited to, read-only memory (ROM), random-access memory (RAM), and various types of non-volatile memory, such as floppy disks or hard disks. The contents and functionality of memory 216 are further discussed below in conjunction with FIGS. 3 and 4.

Figure 3:
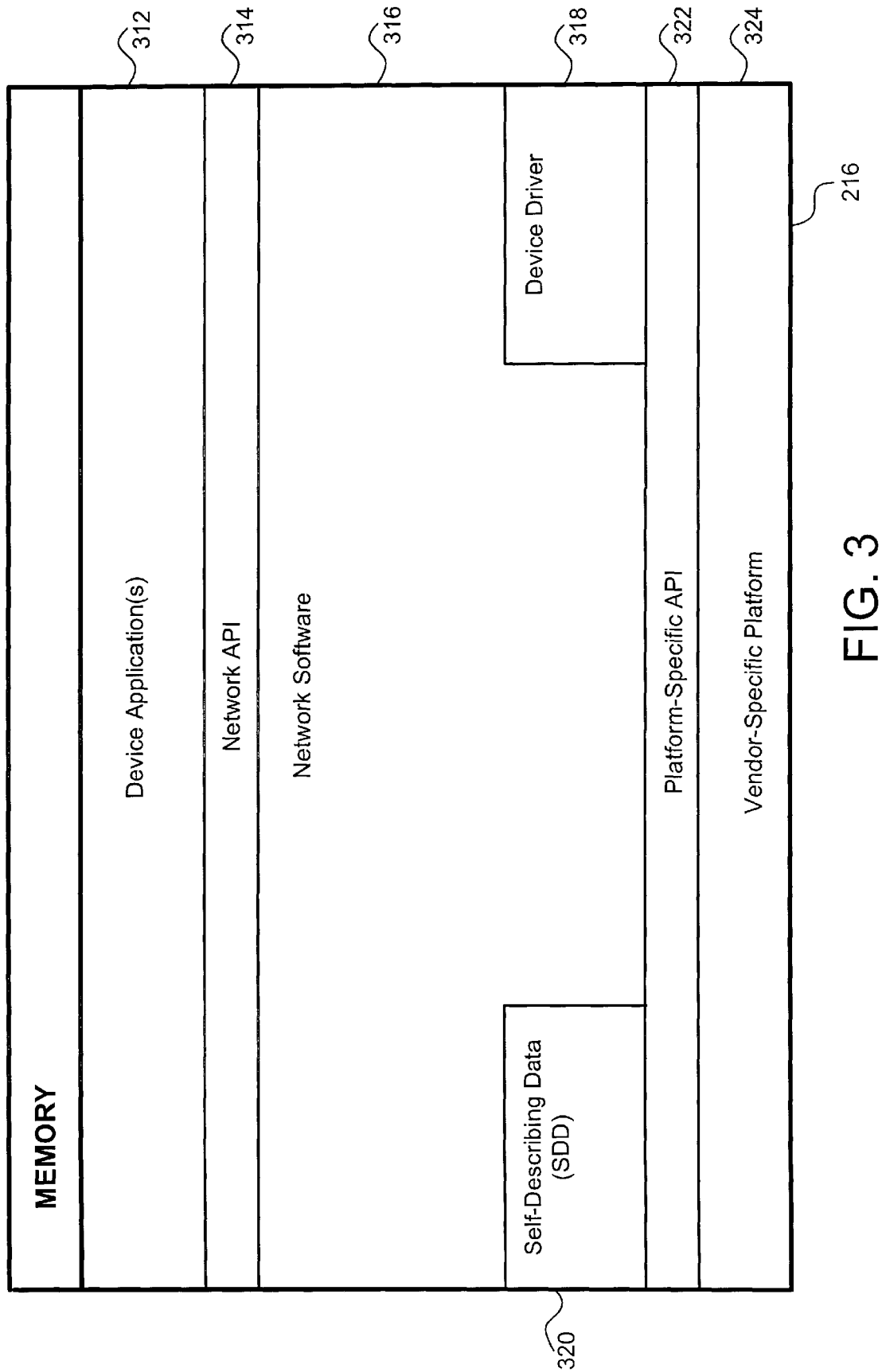
FIG. 3 is a memory map for one embodiment of the memory of FIG. 2, in accordance with the present invention.

Referring now to FIG. 3, a memory map for one embodiment of FIG. 2 memory 216 is shown, in accordance with the present invention. In the FIG. 3 embodiment, memory 216 includes one or more device applications 312, a network application program interface (API) 314, network software 316, self-describing data (SDD) 320, a device driver 318, a platform-specific application program interface (API) 322, and a vendor-specific platform 324. In alternate embodiments, memory 216 may readily include various components and elements that are different from, or in addition to, those software components 312 through 324 discussed in conjunction with the FIG. 3 embodiment.

In the FIG. 3 embodiment, device application 312 preferably includes software instructions that are executed by processor 212 (FIG. 2) to effectively manage and control the functionality of device 112. Network API 314 preferably serves as an interface between various elements of network software 316 and device application 312.

In the FIG. 3 embodiment, network software 316 preferably includes one or more software elements that are executed by processor 212 to advantageously permit device 112 to communicate and cooperate with other devices in network 110. The contents and functionality of network software 316 are further discussed below in conjunction with FIG. 4.

Self-describing data (SDD) 320 preferably includes various types of relevant information regarding device 112. For example, SDD 320 may include information specifying the manufacturer, model, version, serial number, and other fixed data that specifically corresponds to device 112. Device driver 318 preferably includes appropriate software instructions that permit device 112 to communicate with network bus 120 (FIG. 1).

In the FIG. 3 embodiment, platform-specific API 322 provides an interface that preferably permits network software 316 to communicate with vendor-specific platform 324. In the FIG. 3 embodiment, vendor-specific platform 324 may include basic operating system software for supporting low-level operations of device 112.

The FIG. 3 embodiment of memory 216 typically corresponds to a full device (or FD, as discussed above in conjunction with FIG. 1) that preferably includes a complete set of network software 316 to permit optimal compatibility and functionality with network 110. Alternately, memory 216 may correspond to an intermediate device (ID) which includes only a reduced set of software elements from network software 316. In contrast, a base device (BD) is preferably hosted on network 110 by a full device or an intermediate device, and therefore typically does not include network software 316. A base device, however, preferably does include self-describing data 320 and a device driver 318.

A legacy device (LD) may be defined as a device that does not comply with the architectural specifications of network 110 and network software 316. Legacy devices typically were designed and manufactured prior to the design and implementation of network 110 and network software 316. Therefore, a legacy device is preferably hosted on network 110 by a full device or an intermediate device, and typically does not include network software 316 or self-describing data 320. A digital base device, however, may include a device driver 318 for interfacing with network bus 120.

Figure 4:
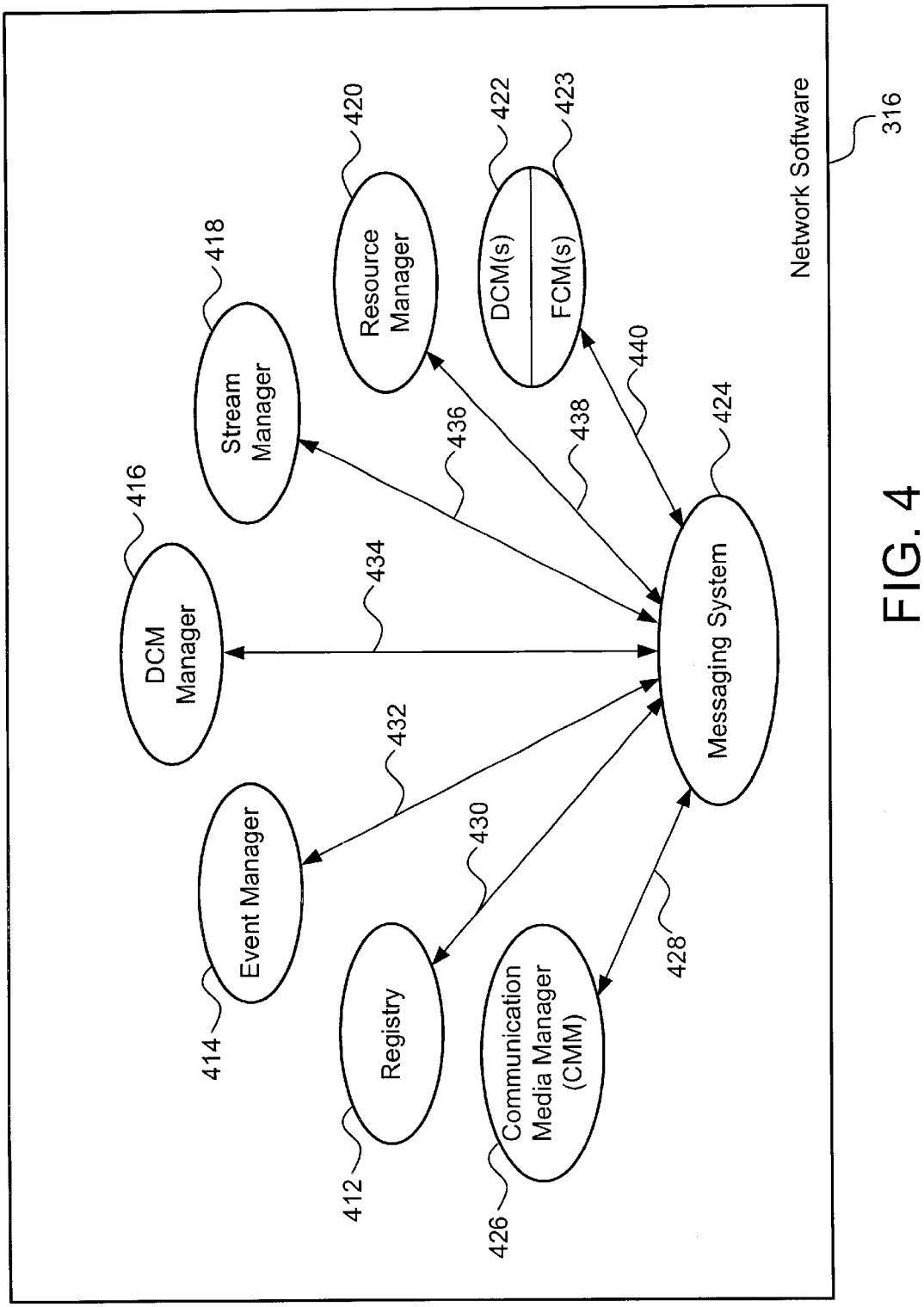
FIG. 4 is a diagram for one embodiment of the network software of FIG. 3, in accordance with the present invention.

Referring now to FIG. 4, a diagram for one embodiment of the network software 316 of FIG. 3 is shown, in accordance with the present invention. In the FIG. 4 embodiment, network software 316 preferably comprises a number of software elements, including a registry 412, an event manager 414, a device control module (DCM) manager 416, a stream manager 418, a resource manager 420, one or more device control modules (DCMs) 422 and one or more corresponding functional control modules (FCMs) 423, a messaging system 424, and a communication media manager (CMM) 426.

In the FIG. 4 embodiment, software elements 412 through 426 are preferably configured to function in accordance with the Home Audio/Video Interoperability (HAVi) architecture which has previously been incorporated herein by reference. However, in alternate embodiments, network software 316 may readily conform to any other appropriate and compatible interoperability architecture, and may also include various software elements that are different from, or in addition to, those elements 412 through 426 that are presented in the FIG. 4 embodiment.

In the FIG. 4 embodiment, registry 412 may preferably include a listing of software elements in network software 316. Registry 412 also preferably may include relevant element information or attributes corresponding to the listed software elements. For example, elements 412 through 426 from network software 316 and corresponding element information may be listed in registry 412. Registry 412 therefore may serve as a directory service for software elements in network 110. Registry 412 may thus allow any software element to obtain a software element identifier (SEID) for identifying and locating another software element in network 110. In accordance with the present invention, registry 412 may also include a remote registry list that identifies all remote registries on network 110.

In the FIG. 4 embodiment, event manager 414 preferably serves as a network-event notification service to notify various software elements (that have previously subscribed for notification) about the occurrence of a specified network event, such as a change in a software element or a change in network 110. DCM manager 416 is preferably responsible for installing and removing DCMs 422 on full devices or intermediate devices. Stream manager 418 is preferably responsible for managing real-time transfer of data and other information between various functional components of network 110.

In the FIG. 4 embodiment, resource manager 420 preferably facilitates the sharing of various resources and scheduling of various actions in network 110. A device control module (DCM) 422 preferably includes a software element that is used to control a specific associated device on network 110. A given DCM 422 preferably includes one or more directly-corresponding functional control modules (FCMs) 423 that each control a specific functional component within the particular device 112 that corresponds to the FCM 423. A full device or an intermediate device may preferably host a DCM 422 to control a remote base device or a legacy device on network 110. In an intermediate device, the hosted DCM 422 is preferably embedded as part of network software 316. In a full device, the hosted DCM 422 may be downloaded from the corresponding remote device in network 110.

In the FIG. 4 embodiment, messaging system 424 is preferably responsible for bi-directionally transferring various messages between the software elements of network software 316. Communication media manager (CMM) 426 coordinates and manages asynchronous and isochronous communications through device driver 318 onto network bus 120. In addition to software elements 412 through 426 of network software 316, a full device may also include a bytecode runtime environment (not shown) to permit the full device to download and execute one or more remote DCM (s) 422 to thereby host and control other devices on network 110.

Network software 316 preferably performs a number of significant and related operations whenever a particular device is removed from, or added to, network 110. When a device is added or removed from network 110, then network bus 120 preferably triggers a bus reset event which notifies all connected devices about the change in network 110. Following the bus reset event, all DCM managers 416 in network 110 preferably perform a negotiation procedure to determine which, if any, DCM manager 416 is the most appropriate host for controlling the newly-added device 112. Each DCM manager 416 in network 110 must therefore maintain a current list of all devices in network 110. Network software 316 preferably also updates relevant software element information in registry 412 whenever a device is removed from, or added to, network 110. In the FIG. 4 embodiment, a given local registry 412 also preferably includes a list of all remote registries in network 110.

Figure 5:
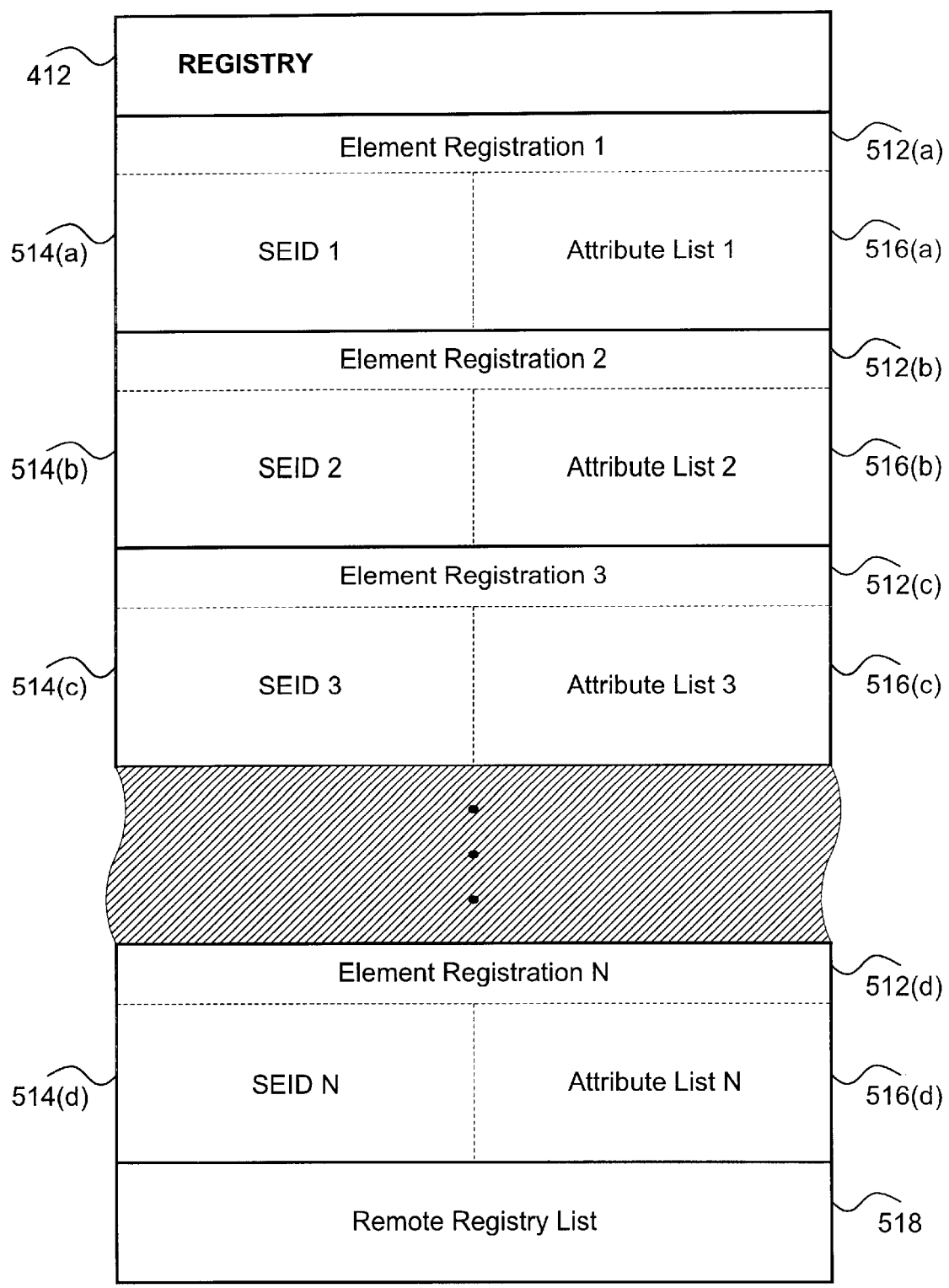
FIG. 5 is a diagram for one embodiment of the registry of FIG. 4, in accordance with the present invention.

Referring now to FIG. 5, a diagram for one embodiment of the FIG. 4 registry 412 is shown, in accordance with the present invention. In the FIG. 5 embodiment, registry 412 preferably includes an element registration 1 (512(a)) through an element registration N (512(d)), and remote registry list 518. Each FIG. 5 element registration 512(a) through 512(d) preferably corresponds to a local software element in network 110. For example, any one of element registration 512(a) through 512(d) may uniquely correspond to an associated software element from network software 316 (FIG. 4).

In the FIG. 5 embodiment, each element registration 512(a) through 512(d) preferably includes a software element identifier (SEID) and a corresponding attribute list. Therefore, element registration 1 (512(a)) through element registration N (512(d)) each preferably include a corresponding respective SEID 1 (514(a)) through SEID N (514(d)), and a associated respective attribute list 1 (516(a)) through attribute list N (516(d)). In alternate embodiments, registry 412 may readily be configured to include various components in addition to, or instead of, those shown in the FIG. 5 embodiment.

In the FIG. 5 embodiment, each SEID 1 (514(a)) through SEID N (514(d)) preferably includes a global unique identifier (GUID) and a software element local handle (SELH) that are used to uniquely identify a specific software element in network 110. Attribute list 1 (516(a)) through attribute list N (516(d)) preferably each include relevant information corresponding to the associated software element. For example, such relevant information may include, but is not limited to, an element manufacturer, an element model, a version level, and various other element features. In the FIG. 5 embodiment, remote registry list 518 preferably includes a list of all remote registries on remote devices across network 110. Remote registry list 518 is further discussed below in conjunction with FIGS. 7 and 8.

In the FIG. 5 embodiment, registry 412 may be advantageously utilized during communications between various software elements in network 110. In order to send a message to a target element in network 110, a source element preferably identifies the target element by using the corresponding SEID 514 of that target element. In network 110, a source element preferably obtains the correct SEID 514 of the target element by accessing, from registry 412, the appropriate element registration 512 that uniquely corresponds to the target element. Once a source element locates an SEID 514 for a target element using any appropriate examination technique, then the source element may use the located SEID 514 to communicate with the corresponding target element via messaging system 424 (FIG. 4). In accordance with the present invention, various techniques for locating a target element are further discussed below in conjunction with FIGS. 6 through 11.

Figure 6:
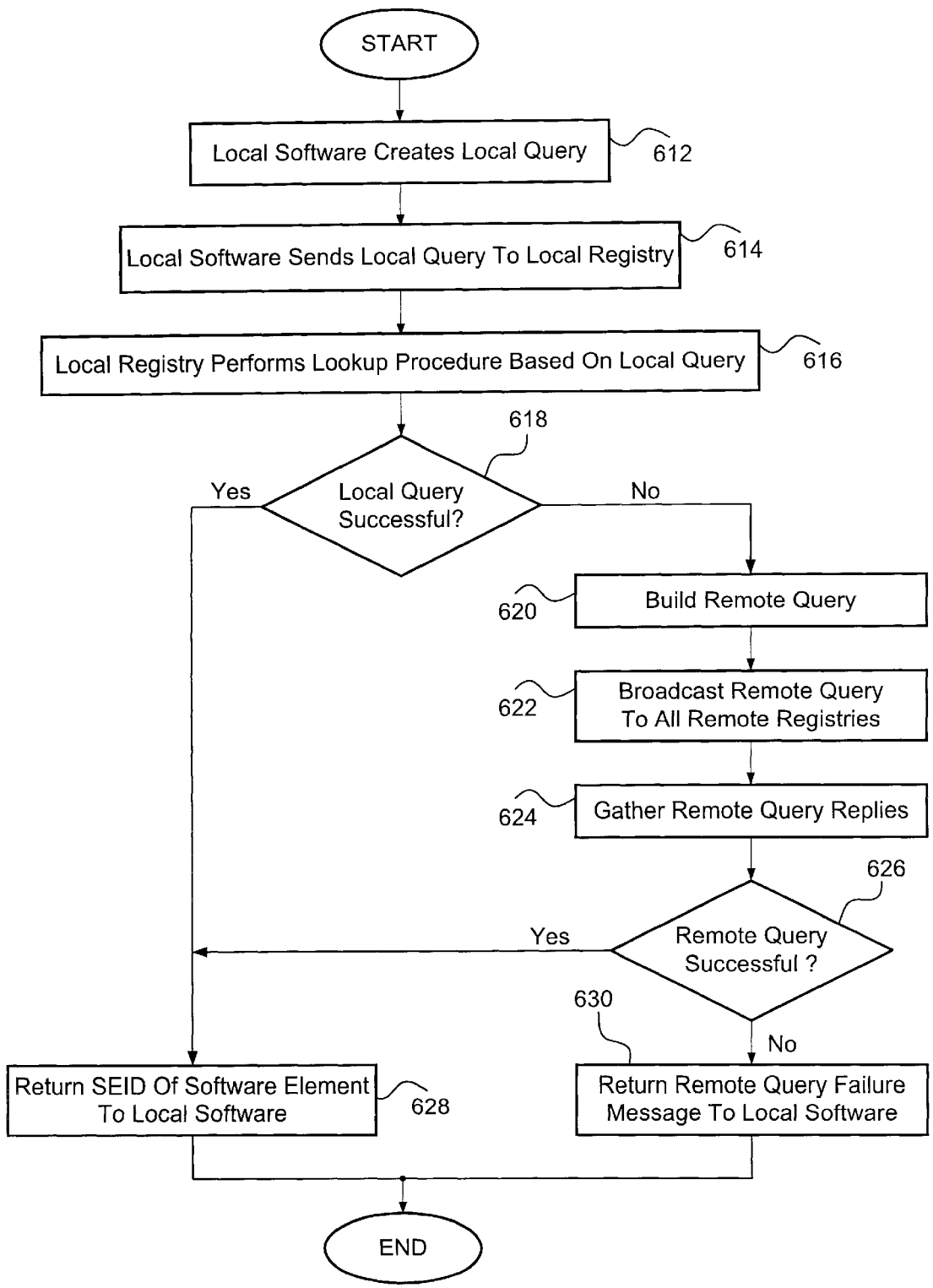
FIG. 6 is a flowchart of method steps for performing a query process, in accordance with one embodiment of the present invention.

Referring now to FIG. 6, a flowchart of method steps for performing a query process is shown, in accordance with one embodiment of the present invention. In the FIG. 6 embodiment, initially, local software (such as device application 312) creates a local query to locate a desired target software element in network 110. Queries may be configured using any appropriate format, and may specify desired criteria such as one or more software element attributes.

In step 614, the local software preferably transmits the local query to local registry 412. In response, in step 616, local registry 412 performs a lookup procedure to determine whether any locally-registered software elements satisfy the local query transmitted from the local software. In step 618, if the local query is successful and a local software element is located that satisfies the query criteria, then, in step 628, local registry 412 returns the SEID of that local software element to the querying local software and the FIG. 6 process terminates.

However, in step 618, if the local query is not successful, then, in step 620, local registry 412 builds a remote query that preferably includes the same or similar criteria as the local query transmitted in foregoing step 614. Next, in step 622, local registry 412 broadcasts the remote query to all remote registries located on other devices across network 110 in the hope of locating a remote software element that satisfies the remote query.

In step 624, local registry 412 gathers the replies to the remote query from all of the remote registries across network 110. Then, in step 626, local registry 412 determines whether the remote query was successful in locating at least one target software element for the local software. In the FIG. 6 embodiment, such a successful remote query reply preferably includes the SEID of the remote target software element. If the remote query fails to successfully locate a target software element, then, in step 630, local registry 412 returns a remote query failure message to the local software. However, if the remote query successfully locates a target software element, then, in step 628, local registry 412 returns the SEID of the target software element to the local software that initiated the FIG. 6 query process in foregoing step 614.

The local software may then utilize the SEID of the remote target software element to communicate with the target software element. However, the foregoing remote query process (FIG. 6, steps 620 through 626) typically requires excessive messaging across network 110, and also consumes substantial amounts of processing resources. An alternative technique for performing a hierarchical remote query in network 110 is discussed below in conjunction with FIGS. 7 through 11.

Figure 7:
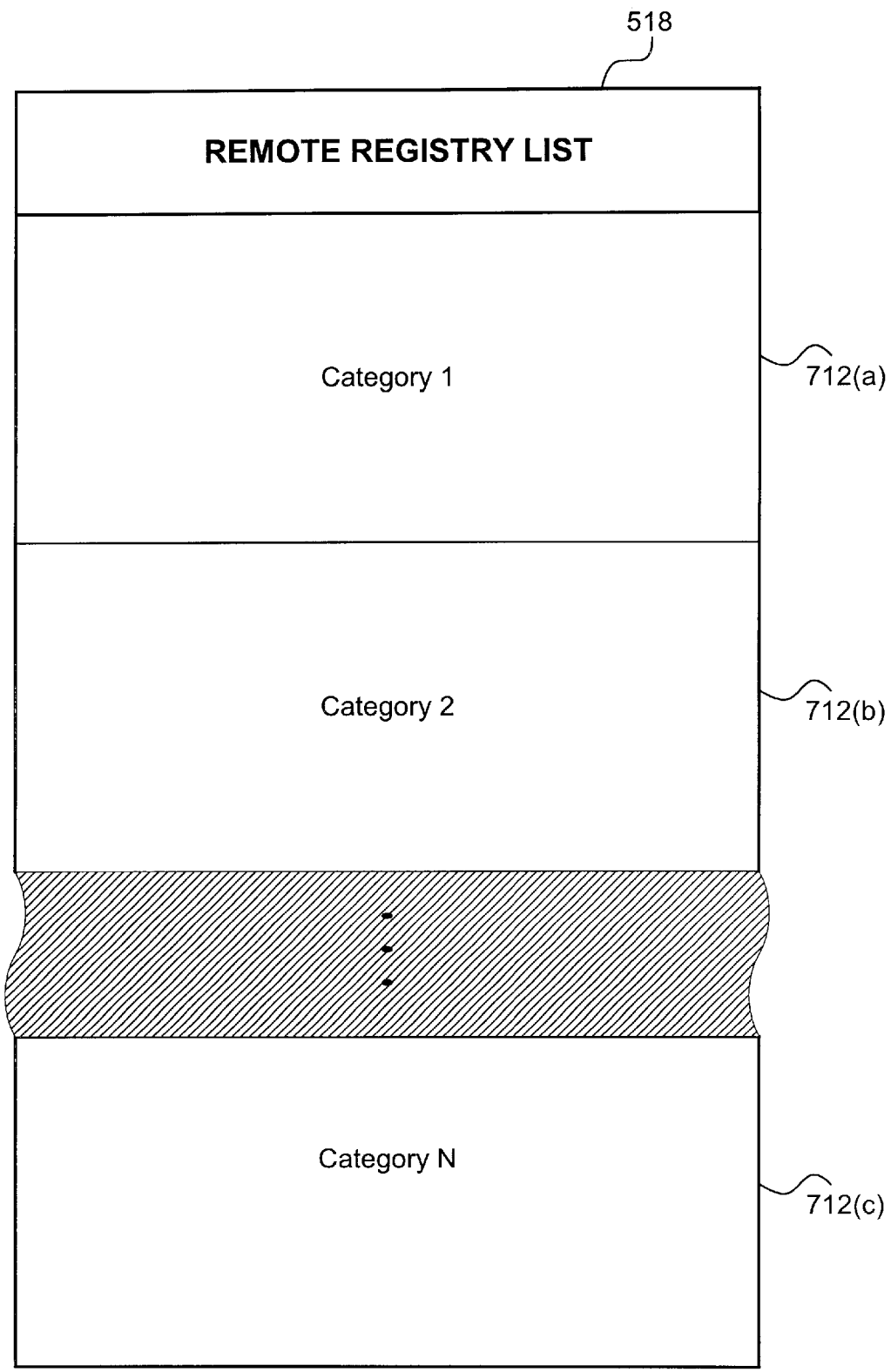
FIG. 7 is a diagram of one embodiment of the remote registry list of FIG. 5, in accordance with the present invention.

Referring now to FIG. 7, a diagram for one embodiment of the FIG. 5 remote registry list 518 is shown, in accordance with the present invention. In the FIG. 7 embodiment, remote registry list 518 preferably includes a number of separate categories 712, including a category 1 (712(a)) through a category N (712(c)). In various embodiments of the present invention, remote registry list 518 may therefore be selectively configured to include any desired number of categories 712. The contents and functionality of the FIG. 7 categories 712 are further discussed below in conjunction with FIGS. 8 through 11.

Figure 8:
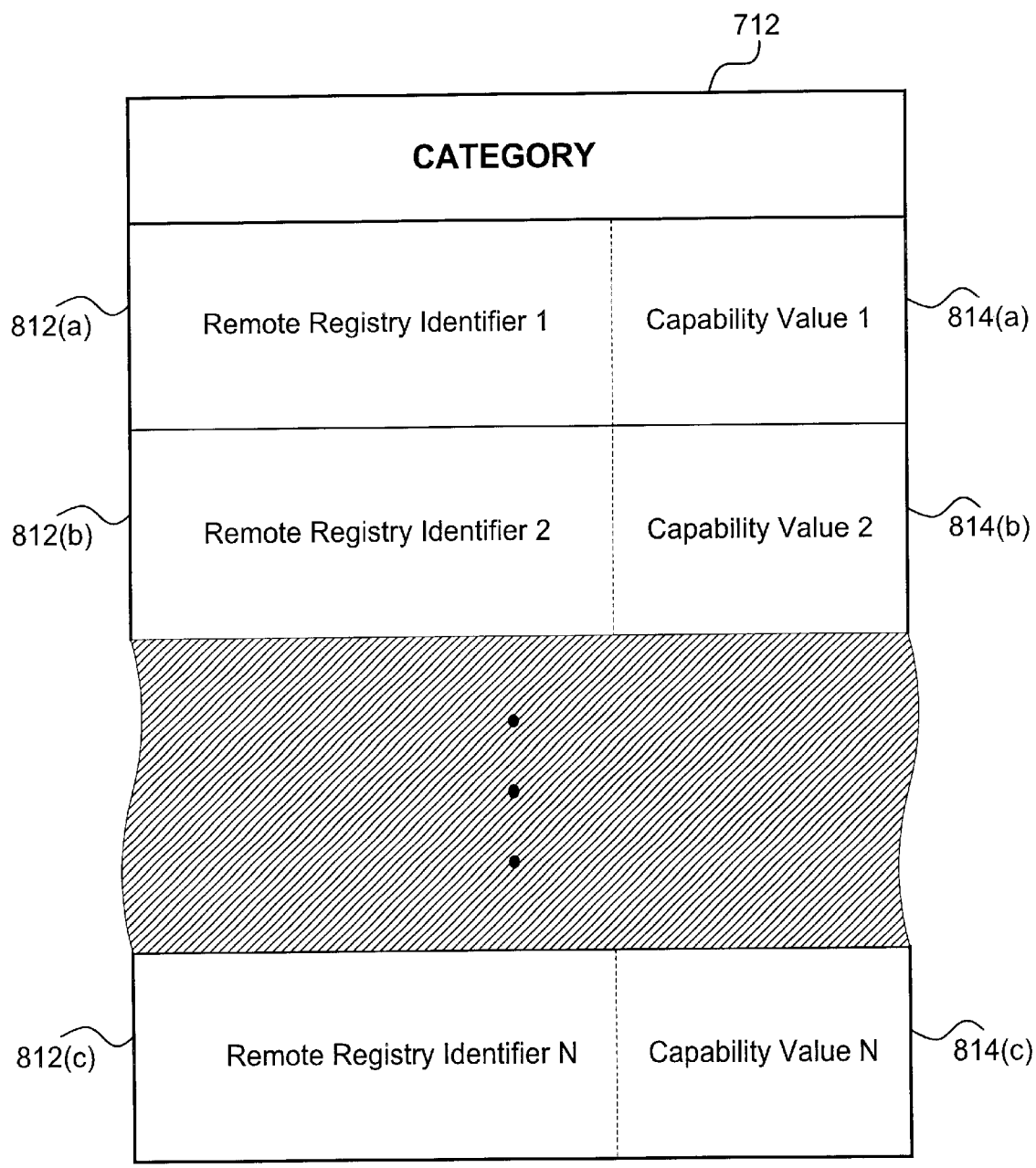
FIG. 8 is a diagram for one embodiment of an exemplary category from FIG. 7, in accordance with the present invention.

Referring now to FIG. 8, a diagram for one embodiment of an exemplary category 712 from FIG. 7 is shown, in accordance with the present invention. In the FIG. 8 embodiment, category 712 preferably includes a series of remote registry identifiers 812, including remote registry identifier 1 (812(a)) through remote registry identifier N (812(c)). In the FIG. 8 embodiment, remote registry identifiers 812 may each include a different software element identifier (SEID) that uniquely corresponds with an associated remote registry on network 110, as discussed above in conjunction with FIG. 5. In accordance with the present invention, a given remote registry list 518 therefore preferably comprises two or more categories 712 that each include a different set of remote registry identifiers 812.

In the FIG. 8 embodiment, category 712 preferably also includes a series of capability values 814, including capability value 1 (814(a)) through capability value N (814(c)). In the FIG. 8 embodiment, each capability value 814 represents the relative capability of a corresponding device on network 110. Capability values 814 are each also associated with a different respective remote registry identifier 812 on remote registry list 712. The capability value 814 for a particular device on network 110 may be based on any appropriate operating parameters or other relevant criteria corresponding to the device in question. For example, the relative capability value 814 of a given device may be evaluated by examining factors such as processing resources, memory size, communications bandwidth, and software configuration. Determining an appropriate capability value 814 is further discussed below in conjunction with FIGS. 9 and 10.

In the FIG. 8 embodiment, the present invention preferably classifies remote registry identifiers 812 into different categories 712 according to their corresponding capability values 814. For example, in one embodiment, each category 712 preferably includes only those remote registry identifiers 812 that fall within a specified range of capability values 814. In this manner, remote registries on network 110 may be advantageously classified into different categories 712 depending upon the capability values 814 of the particular devices on which the various remote registries reside. The present invention may then hierarchically broadcast remote queries to individual categories 712, in accordance with the present invention.

Figure 9:
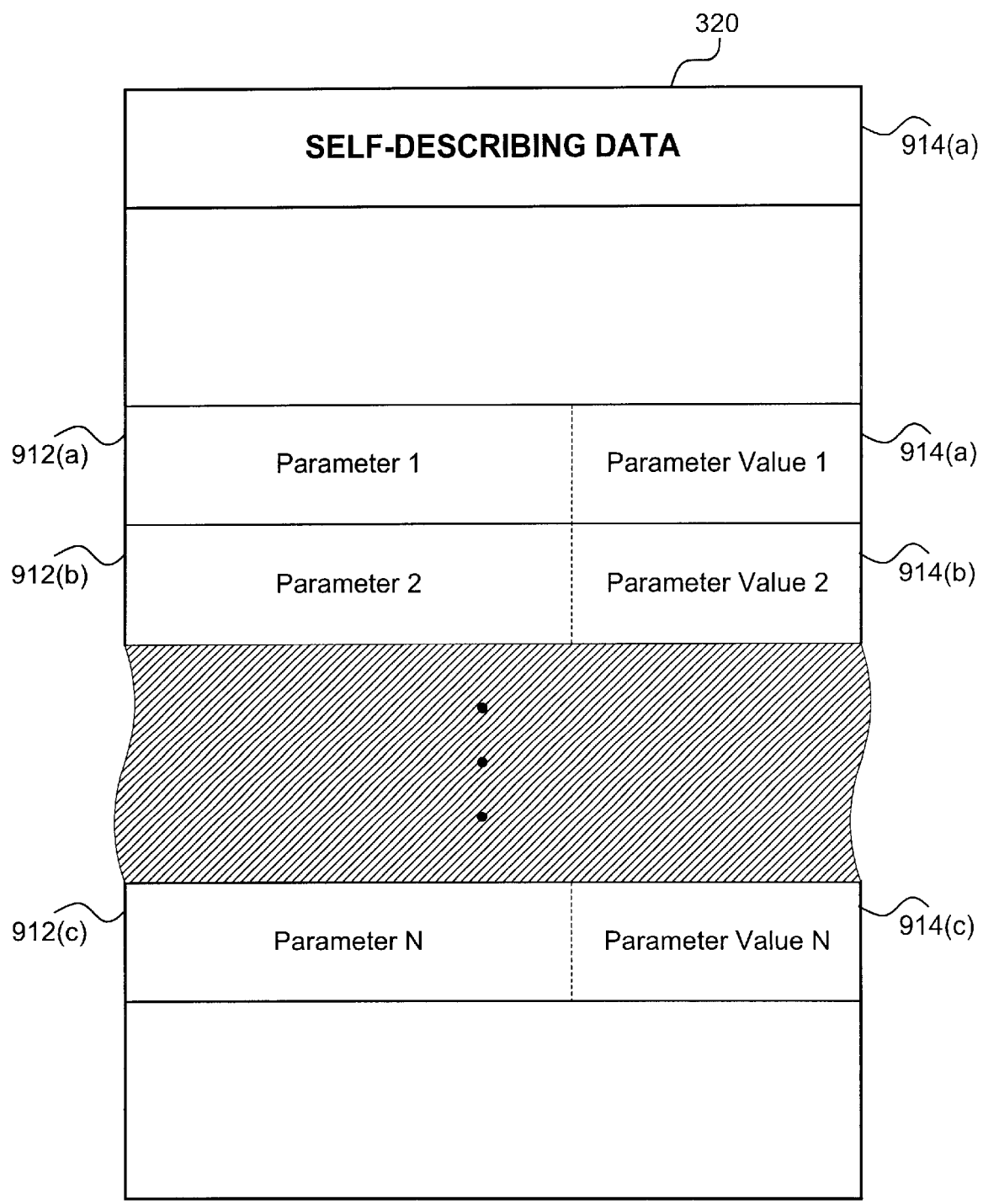
FIG. 9 is a diagram for one embodiment of the self-describing data from FIG. 3, in accordance with the present invention.

Referring now to FIG. 9, a diagram for one embodiment of the FIG. 3 self-describing data 320 is shown, in accordance with the present invention. In the FIG. 9 embodiment, self-describing data (SDD) 320 preferably includes a series of parameters 912, including parameter 1 (912(a)) through parameter N (912(c)). Parameters 912 preferably may be selected to include any relevant characteristics that relate to the overall capability of a given device on network 110. For example, parameters 912 may include device processing power, device memory capacity, and device communications bandwidth for a particular device on network 110.

The FIG. 9 embodiment of SDD 320 also comprises a series of parameter values 914, including parameter value 1 (914(a)) through parameter value N (914(c)). Each one of parameter values 914 preferably corresponds to a respective associated parameter 912 from SDD 914. In the FIG. 9 embodiment, the magnitude of a given parameter value 914 is preferably proportional to the relative capability of the associated parameter 912. For example, a device having a memory capacity parameter with a parameter value of five possesses greater memory capability than a device having a memory capacity parameter with a parameter value of two. In one embodiment of the present invention, the overall capability value 814 (FIG. 8) for a given device on network 110 may therefore readily be calculated by summing all parameter values 914 from SDD 320. In other embodiments, capability values 814 may also be obtained using any other appropriate and compatible methodology.

Figure 10:
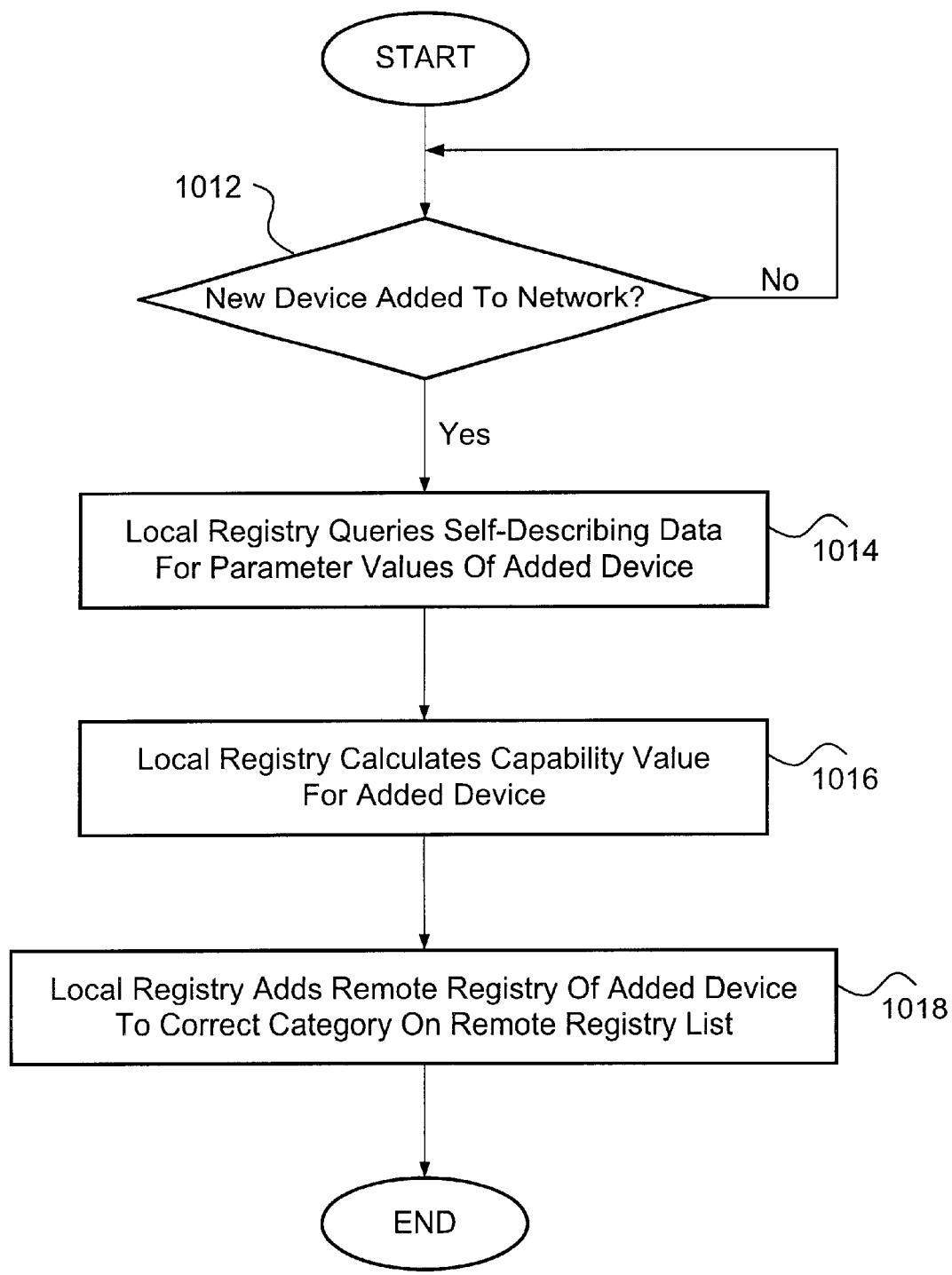
FIG. 10 is a flowchart of method steps for classifying devices into categories, in accordance with one embodiment of the present invention.

Referring now to FIG. 10, a flowchart of method steps for classifying devices into categories 712 is shown, in accordance with one embodiment of the present invention. However, other suitable and effective techniques for classifying devices into categories 712 are similarly contemplated for use with the present invention.

In the FIG. 10 embodiment, initially, in step 1012, network software 316 monitors network 110 to determine whether a new device is added to network 110. If a new device is added to network 110, then an added-device notification is preferably generated and provided to all registries on network 110. In step 1014, in response to the added-device notification, each local registry 412 in network 110 preferably sends a query to the self-describing data 320 residing in memory 216 of the newly-added device.

If the newly-added device includes a registry software element, then, in step 1016, each local registry 412 preferably calculates a capability value 814 for the newly-added device, as discussed above in conjunction with FIG. 9. Then, in step 1018, each local registry 412 advantageously classifies the newly-added registry into the appropriate category 712 based on the relative capability of the added device. In the FIG. 10 embodiment, each local registry 412 preferably evaluates the capability value 814 of the newly-added device, and responsively adds a unique remote registry identifier 812 (corresponding to the newly-added remote registry) to the correct category 712 in the local remote registry list 518. The FIG. 10 process thus effectively classifies each registry in network 110 into appropriate categories 712 based on the relative capability of its host device.

Figure 11:
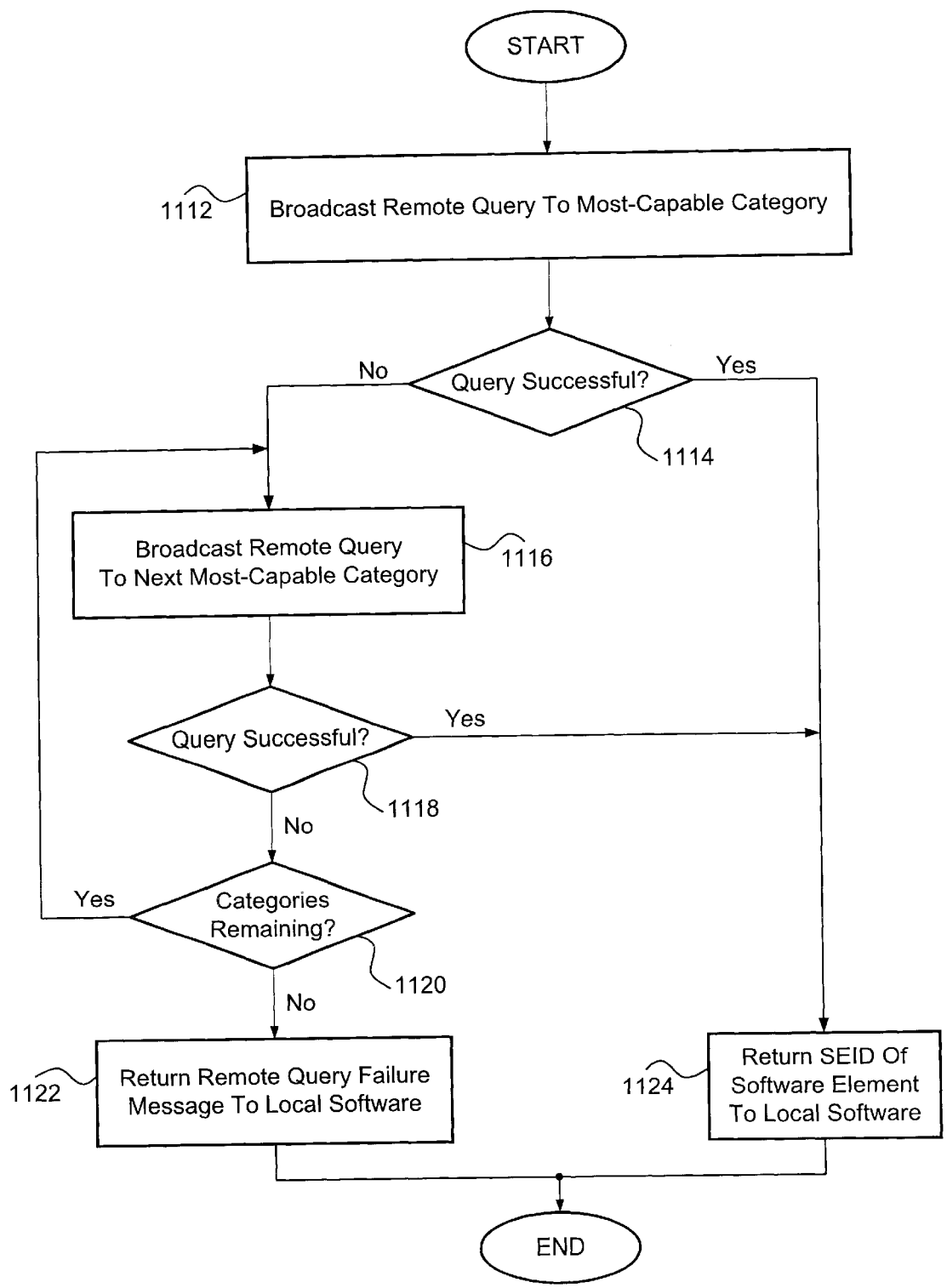
FIG. 11 is a flowchart of method steps for performing a hierarchical remote query, in accordance with one embodiment of the present invention.

Referring now to FIG. 11, a flowchart of method steps for performing a hierarchical remote query is shown, in accordance with one embodiment of the present invention. The FIG. 11 method steps provide a more efficient and effective technique for reducing messaging traffic and resource consumption when performing the remote query broadcast process discussed above in conjunction with steps 622 through 630 of FIG. 6.

In the FIG. 11 embodiment, in step 1112, local registry 412 initially broadcasts the remote query (from step 620 of FIG. 6) only to remote registries of devices from the most-capable category 712 of remote registry list 518. In other words, the remote query is initially propagated only to those remote registries that are most likely to provide successful remote query replies, instead of inefficiently broadcasting the remote query to all remote registries on network 110. The hierarchical remote query technique thus does not initially burden devices having reduced processing resources with the remote query, thereby freeing those devices to perform other important processing tasks.

In step 1114, local registry 412 determines whether the initial remote query was successful in locating a target software element based on the particular remote query criteria. If the initial remote query was successful, then, in step 1124, local registry 412 preferably returns the SEID of the target software element to the local software that initiated the query (see FIG. 6, steps 612 and 614).

However, in step 1114, if the initial remote query was not successful, then, in step 1116, local registry 412 preferably broadcasts the remote query to the next most-capable category 712 of remote registries listed in remote registry list 518. In other words, only when a remote query to a given category 712 is unsuccessful does local registry 412 successively rebroadcast the remote query to a series of registry categories of devices that have lower relative capability values 814.

In step 1118, local registry 412 determines whether the most recent remote query was successful in locating a target software element. If the most recent remote query was successful, then, in step 1124, local registry 412 preferably returns the SEID of the target software element to the local software that initiated the query.

However, in step 1118, if the most recent remote query was not successful, then, in step 1120, local registry 412 preferably determines whether any categories 712 remain that have not received the remote query. If any categories 712 remain unqueried, then the FIG. 11 process returns to foregoing step 116 to rebroadcast the remote query to the next most-capable category 712. However, if all categories 712 have been queried, then, in step 1122, local registry 412 returns a remote query failure message to the local software that initiated the query process, and the FIG. 11 hierarchical query process terminates.

The present invention thus initially propagates a remote query to only devices with relatively greater processing power and communications bandwidth to provide a rapid query response without significantly depleting valuable network processing resources needed for other tasks. Furthermore, the present invention initially propagates the remote query only to devices with relatively greater memory resources and higher concentrations of individual software elements to thereby substantially increase the likelihood of a successful remote query response, while simultaneously reducing the amount of messaging traffic across network 110.

The invention has been explained above with reference to a preferred embodiment. Other embodiments will be apparent to those skilled in the art in light of this disclosure. For example, the present invention may readily be implemented using configurations and techniques other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A system for performing a query in an electronic network, comprising:
    a local element configured to classify remote elements into discrete categories, said local element then broadcasting said query to said discrete categories in a hierarchical sequence, said local element including a local registry, said remote elements each including a remote registry, said local registry receiving a notification message when a new device is added to said electronic network, said local registry querying self-describing data from said new device to determine capability parameter values for said new device, said capability parameter values corresponding to device parameters, said device parameters including a processing parameter, a memory parameter, and a communications parameter; and
    a processor, coupled to said system, for controlling said local element to thereby perform said query in said electronic network.

2. A system for performing a query in an electronic network, comprising:
    a local element configured to classify remote elements into discrete categories, said local element then broadcasting said query to said discrete categories in a hierarchical sequence, said local element including a local registry, said remote elements each including a remote registry, said local registry receiving a notification message when a new device is added to said electronic network, said local registry querying self-describing data from said new device to determine capability parameter values for said new device, said local registry summing said capability parameter values to obtain a capability value for said new device, said local registry creating a remote registry identifier associated with said new device, and assigning said remote registry identifier to one of said discrete categories based upon said capability value for said new device; and
    a processor, coupled to said system, for controlling said local element to thereby perform said query in said electronic network.

3. The system of claim 2 wherein said local registry assigns said remote registry identifier to one of said discrete categories within a remote registry list.

4. The system of claim 2 wherein a local software module creates a local query and propagates said local query to said local registry which responsively performs said local query.

5. The system of claim 4 wherein said local registry creates a remote query based upon said local query whenever said local query is unsuccessful.

6. The system of claim 5 wherein said local registry initially broadcasts said remote query only to most-capable registries from a most-capable category of said discrete categories.

7. The system of claim 6 wherein said local registry rebroadcasts said remote query to next most-capable registries from a next most-capable category of said discrete categories whenever a prior remote query broadcast is unsuccessful.

8. The system of claim 7 wherein said local registry repeatedly rebroadcasts said remote query whenever said prior remote query broadcast is unsuccessful until all of said discrete categories have been queried.

9. The system of claim 7 wherein said local registry returns a software element identifier for locating a target software element to said local software module whenever said remote query is successfully answered.

10. The system of claim 7 wherein said local registry returns a remote query failure message to said local software module after said remote query has been unsuccessfully propagated to all of said discrete categories.

11. A method for performing a query in an electronic network, comprising the steps of:
    classifying remote elements into discrete categories using a local element, said local element including a local registry, said remote element including a remote registry, said local registry receiving a notification message when a new device is added to said electronic network;

broadcasting said query to said discrete categories in a hierarchical sequence using said local element, said local registry querying self-describing data from said new device to determine capability parameter values for said new device, said capability parameter values corresponding to device parameters, said device parameters including a processing parameter, a memory parameter, and a communications parameter; and controlling said local element with a processor to thereby perform said query in said electronic network.

12. A method for performing a query in an electronic network, comprising the steps of:

classifying remote elements into discrete categories using a local element, said local element including a local registry, said remote element including a remote registry, said local registry receiving a notification message when a new device is added to said electronic network;

broadcasting said query to said discrete categories in a hierarchical sequence using said local element, said local registry querying self-describing data from said new device to determine capability parameter values for said new device, said local registry summing said capability parameter values to obtain a capability value for said new device, said local registry creating a remote registry identifier associated with said new device, and assigning said remote registry identifier to one of said discrete categories based upon said capability value for said new device; and controlling said local element with a processor to thereby perform said query in said electronic network.

13. The method of claim 12 wherein said local registry assigns said remote registry identifier to one of said discrete categories within a remote registry list.

14. The method of claim 12 wherein a local software module creates a local query and propagates said local query to said local registry which responsively performs said local query.

15. The method of claim 14 wherein said local registry creates a remote query based upon said local query whenever said local query is unsuccessful.

16. The method of claim 15 wherein said local registry initially broadcasts said remote query only to most-capable registries from a most-capable category of said discrete categories.

17. The method of claim 16 wherein said local registry rebroadcasts said remote query to next most-capable registries from a next most-capable category of said discrete categories whenever a prior remote query broadcast is unsuccessful.

18. The method of claim 17 wherein said local registry repeatedly rebroadcasts said remote query whenever said prior remote query broadcast is unsuccessful until all of said discrete categories have been queried.

19. The method of claim 17 wherein said local registry returns a software element identifier for locating a target software element to said local software module whenever said remote query is successfully answered.

20. The method of claim 17 wherein said local registry returns a remote query failure message to said local software module after said remote query has been unsuccessfully propagated to all of said discrete categories.

* * * * *